US010079548B2

(12) United States Patent
Kong et al.

(10) Patent No.: US 10,079,548 B2
(45) Date of Patent: Sep. 18, 2018

(54) SYNCHRONOUS RECTIFIER CONTROL WITH ADAPTIVE MINIMUM OFF-TIME

(71) Applicant: DIALOG SEMICONDUCTOR INC., Campbell, CA (US)

(72) Inventors: Pengju Kong, Campbell, CA (US); Hien Bui, Campbell, CA (US); Hanguang Zhang, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 19 days.

(21) Appl. No.: 15/413,042

(22) Filed: Jan. 23, 2017

(65) Prior Publication Data

US 2018/0212527 A1 Jul. 26, 2018

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0048* (2013.01)

(58) Field of Classification Search
CPC ............. H02M 3/33592; H02M 1/08; H02M 2001/0048
See application file for complete search history.

(56) References Cited

U.S. PATENT DOCUMENTS

| 2006/0155551 | A1* | 7/2006 | Ueda | H03K 3/84 331/78 |
| 2009/0016083 | A1* | 1/2009 | Soldano | H02M 3/33592 363/20 |
| 2010/0118565 | A1* | 5/2010 | Stuler | H02M 3/33592 363/21.08 |
| 2014/0003096 | A1* | 1/2014 | Deng | H02M 3/33592 363/21.14 |
| 2014/0192575 | A1* | 7/2014 | Olivik | H02M 3/33592 363/89 |
| 2015/0295418 | A1* | 10/2015 | Ren | H02J 5/005 307/104 |
| 2015/0318790 | A1* | 11/2015 | Tichy | H02M 3/33592 363/21.14 |
| 2017/0033698 | A1* | 2/2017 | Vemuri | H02M 3/33592 |

* cited by examiner

*Primary Examiner* — Adolf Berhane
*Assistant Examiner* — Bart Iliya
(74) *Attorney, Agent, or Firm* — Haynes and Boone, LLP

(57) ABSTRACT

A switching power converter may include a power switch coupled to a primary winding of a transformer, and a primary controller configured to turn on and off the power switch, a synchronous rectifier switch coupled to a secondary winding of a transformer, and a synchronous rectifier controller configured to turn on and off the synchronous rectifier switch. The synchronous rectifier controller may monitor a voltage across the synchronous rectifier switch. The synchronous rectifier controller may determine a period of a resonant oscillation of the voltage across the synchronous rectifier switch following at least one cycling off of the synchronous rectifier switch. The synchronous rectifier controller may adjust the minimum off-time period for the synchronous rectifier switch based on the period of the resonant oscillation. The synchronous rectifier controller may adaptively adjust a minimum off-time period for the synchronous rectifier switch.

20 Claims, 4 Drawing Sheets

SYNCHRONOUS RECTIFIER CONTROL WITH ADAPTIVE MINIMUM OFF-TIME

TECHNICAL FIELD

This application relates to switching power converters, and more particularly to switching power converters that use synchronous rectification.

BACKGROUND

The explosive growth in mobile electronic devices such as smartphones and tablets creates an increasing need in the art for compact and efficient switching power converters so that users may recharge these devices. A flyback switching power converter is typically provided with a mobile device as its transformer provides a safe isolation from AC household current. It was conventional for flyback converters to include a rectifying diode at the secondary (load) side of the transformer but such rectifying diodes are not power efficient. Thus, synchronous rectification techniques have been developed that replace the rectifying diode with an actively controlled switch such as a field-effect transistor (FET) device (e.g., a metal oxide semiconductor field-effect transistor (MOSFET) device) to improve operating efficiencies by taking advantage of its lower power losses.

Conventional flyback converters with synchronous rectification typically include a synchronous rectifier (SR) controller that controls the synchronous rectifier (SR) switch based on a voltage across the synchronous rectifier switch terminals. When this voltage falls below an on-time threshold following the cycling off of the power switch, the SR controller switches on the SR switch so that power is delivered to the load. During this power delivery, the voltage across the SR switch gradually rises above the on-time threshold voltage until it crosses an off-time threshold voltage. This off-time threshold voltage corresponds to the voltage across the SR switch at the transformer reset time when the secondary winding current has ramped down to zero.

The timing of the on and off states for the SR switch is critical to reduce losses. But the control with regard to the on-time and off-time threshold voltages is problematic because the voltage across the SR switch will have a resonant oscillation at the switch on and off times due to parasitic effects. When the SR switch is switched on following the cycling off of the power switch, this resonant ringing could cause the switch voltage to exceed the off-time threshold voltage such that the SR controller would undesirably switch off the SR switch even though the secondary winding current is still relatively robust (it being well before the transformer reset time). To prevent such an undesirable premature cycling off of the SR switch, it is conventional for the SR controller to apply a minimum on-time period with regard to monitoring the off-time threshold voltage following the cycling on of the SR switch. During this minimum on-time period, the controller does not respond to the SR switch voltage exceeding the off-time threshold voltage.

An analogous minimum off-time period follows the cycling off of the SR switch to prevent the SR controller from responding to a resonant oscillation of the SR switch voltage that causes the SR switch voltage to fall below the on-time threshold voltage. But in contrast to the resonant oscillation that occurs at the SR switch on-time, the resonant oscillation at the SR switch off-time is markedly more robust and prolonged. This robust off-time oscillation of the SR switch voltage complicates the setting of an appropriate duration for the minimum off-time period that may be better appreciated through a consideration of the waveforms shown in FIG. 1 for a power cycle 110 and a power cycle 120 of a primary-side power switch S1. In this example, the voltage across an SR rectifier switch (S2) is a drain-to-source ($V_{D-S}$) voltage for a metal-oxide semiconductor field-effect transistor (MOSFET). Power switch S1 is switched off in power cycle 110 at a time t0. In response to the cycling off of power switch S1 at time t0, the drain-to-source voltage for the SR switch falls below the on-time threshold voltage. The SR switch is thus switched on while at the same time a timer (S2 Timer MIN $T_{ON}$) is started to time the minimum on-time period. The resulting resonant oscillation of the drain-to-source voltage is relatively minor and quickly damped such that the duration of the minimum on-time period may be relatively short and terminated at a time t3.

In response to the cycling on of the SR switch at time t0, the secondary winding current pulses high and begins to ramp down until it reaches zero at the transformer reset time (time t1). At the same time, the drain-to-source voltage for the SR switch rises above the off-time threshold voltage (S2 OFF Threshold) such that the SR switch is switched off and a minimum off-time timer (S2 Timer MIN $T_{OFF}$) begins timing the minimum off-time period. The resulting resonant oscillation for the SR switch drain-to-source voltage following time t1 is more pronounced and slower to damp as compared to the damping that occurs at the on time for the SR switch. For power cycle 110, the minimum off-time period has a proper duration that terminates at a time t4 such that the resonant oscillations of the drain-to-source voltage do not cross the on-time threshold voltage following the termination of the minimum off-time period.

But the resonant oscillations following the SR switch off time are more pronounced for a subsequent power cycle 120 of power switch S1. Power cycle 120 thus has a relatively-long ringing period whereas power cycle 110 has a relatively-short ringing period. Due to this more pronounced resonance, the SR switch drain-to-source voltage crosses the on-time threshold voltage at a time 122 following the termination of the minimum off-time period in power cycle 120. As a result, the SR controller cycles the SR switch on despite there being no power pulse to deliver. The result is that the secondary winding current has a slightly negative value during the minimum on-time period following time 122. Upon or just after the termination of this undesirable minimum on-time period, the SR switch drain-to-source voltage again exceeds the off-time threshold voltage such that the SR switch is cycled off for another minimum off-time period. The subsequent resonant oscillation of the SR switch drain-to-source voltage again causes it to exceed the on-time threshold voltage such the SR switch is again cycled on at time 124. Another negative current is induced on the secondary winding until the termination of the current minimum on-time period whereupon the SR switch drain-to-source voltage again exceeds the off-time threshold voltage such the SR switch is opened for another minimum off-time period.

The resulting cycling on and off of the SR switch following the transformer reset time is undesirable for a number of reasons. For example, the negative current excited across the secondary winding wastes power. More fundamentally, the SR switch may be cycled on when the power switch S1 cycles on, which is a severe problem. The prior art setting of the minimum off-time period is thus problematic in that it cannot be set too short or this undesirable cycling of the SR switch occurs, yet it cannot be set too long in that the minimum off-time period would then interfere with the next power switch S1 cycling.

Accordingly, there is a need in the art for improved synchronous rectifier control techniques for switching power converters.

SUMMARY

To address the need in the art for improved synchronous rectification control techniques, a switching power converter is provided with an SR controller configured to monitor the resonant oscillation for a drain-to-source voltage for an SR switch transistor following the SR switch off time to determine a period of the resonant oscillation. The minimum off-time period for the SR switch transistor is then set to the period of the resonant oscillation. In some embodiments, the minimum off-time period may include a small additional amount, e.g., some fraction of the period of the resonant oscillation. In this fashion, a resonant oscillation of the drain voltage is prevented from causing the SR controller to repeatedly cycle the SR switch transistor on and off following a cycle of the power switch transistor.

With regard to this control, it is desirable that the SR controller maintain the SR switch transistor off following a transformer reset time for a minimum off-time period. But conventional SR controllers could not optimize the minimum off-time period for the SR switch transistor due to the variability of the resonant oscillations of the SR switch voltage. If the minimum off-time period was optimized for operation during relatively minor resonant oscillations, a conventional SR controller would then suffer from switching on the SR switch transistor prematurely during periods of more robust resonant oscillations. Conversely, if the minimum off-time period was optimized for operation during relatively robust resonant oscillations, a conventional SR controller would suffer from the likelihood of not being able to properly cycle the SR switch transistor for the subsequent cycle of the power switch transistor. The adaptation of the minimum off-time period to the period of the resonant oscillations cures these problems. For example, during periods of less robust resonant oscillations, the resonant oscillation period is shortened. The SR controller disclosed herein thus adapts to this relatively-short resonant oscillation period by shortening the minimum off-time period accordingly. Conversely, the resonant oscillation period increases as the resonant oscillations become more robust. The SR controller disclosed herein thus adapts to this relatively-long resonant oscillation period by increasing the minimum off-time period. In this fashion, the problems discussed above with regard to conventional SR control are solved.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems, devices, and methods are provided that allow for an adaptive setting of a minimum off-time timer for synchronous rectification.

Figure 2:
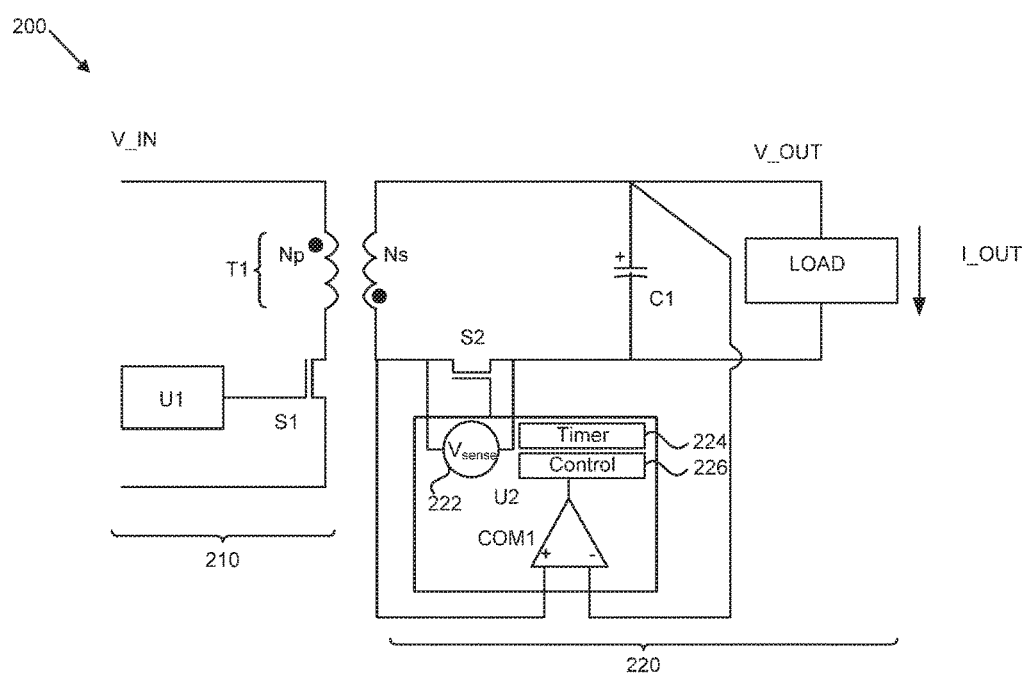
FIG. 2 is a diagram of a flyback converter configured for adaptive synchronous rectifier control in accordance with an aspect of the disclosure.

An example flyback converter 200 configured for adaptive synchronous rectifier control is shown in FIG. 2. In various embodiments, flyback converter 200 includes a primary side such as a power stage 210 and a secondary side such as a secondary output stage 220. Power stage 210 may include a power switch transistor (S1), a primary controller (U1) configured to control the on state and the off state of the power switch transistor, and primary windings Np of a transformer T1. The primary controller maintains the output regulation of flyback converter 200 by controlling the on and off states of the power switch transistor. Secondary output stage 220 may include an SR switch transistor (S2), an SR controller (U2) configured to control the on state and the off state of the SR switch transistor, secondary windings Ns of transformer T1, and an output capacitor C1 for storing an output voltage (V_OUT) provided to a load driven by an output current (I_OUT). The power switch transistor and the SR switch transistor may each be a field-effect transistor (FET) device (e.g., a metal oxide semiconductor field-effect transistors (MOSFET) device), a bipolar junction transistor (BJT) device, or other appropriate switch.

As discussed further herein, the SR controller measures a period of a resonant oscillation for a drain voltage for the SR switch transistor. Based upon this measurement, the SR controller adjusts a minimum off time for the SR switch transistor to be at least as long as the period of the resonant oscillation. The SR controller may measure the period of the resonant oscillation using a wide variety of circuits. The following discussion will be directed to embodiments in which the SR controller includes a comparator that compares the drain voltage for the SR switch transistor to the output voltage to measure the resonant oscillation period. However, it will be appreciated that such a comparator could instead compare the drain voltage to a fixed voltage threshold in alternative embodiments. Alternatively, the SR controller may include a peak detector circuit that determines the time between peak voltages for the drain voltage oscillation to measure the resonant oscillation period.

In some embodiments, the SR controller includes a voltage sensor 222, a minimum off-time timer 224, a control logic circuit 226, and the comparator (COM1). Voltage sensor 222 may be configured to monitor an SR switch voltage such as the drain-to-source voltage for the SR switch transistor in a SR switch MOSFET embodiment. Minimum off-time timer 224 may comprise analog or digital circuitry. Control logic circuit 226 may comprise logic gates or a microcontroller configured to turn on the SR switch transistor for at least a minimum on-time period responsive to the SR switch voltage (as sensed by voltage sensor 222) falling below (e.g., falling edge) an on-time threshold voltage. Note that the on-time triggering of the SR switch transistor is not threshold triggered in alternative embodiments. Control logic circuit 226 may be configured to turn off the SR switch transistor for at least a minimum off-time period responsive to the sensed voltage (e.g., rising edge) exceeding an off-time threshold voltage. However, it may be desirable in alternative embodiments to delay the initiation of the minimum off-time period. For example, the SR controller may include another comparator (not illustrated) that compares the drain voltage for the SR switch transistor to a threshold voltage that is greater than the off-time threshold voltage. In this fashion, the SR controller may guard against a fault condition in which the SR switch transistor is turned off too early such that the secondary current has not reached zero. In such instances, the resonant oscillation will be delayed from the SR switch off time as compared to the default state of switching off the SR switch transistor responsive to the secondary current being extinguished.

Referring again to the comparator, control logic circuit 226 may be further configured to determine from an output of the comparator, a half-period of a resonant oscillation of the drain voltage for the SR switch transistor. The comparator receives the drain voltage of the SR switch transistor at its positive (+) input and the output voltage at its negative (−) input. The comparator output will thus swing high when the drain voltage exceeds the output voltage and will be grounded while the output voltage exceeds the drain voltage. For example, control logic circuit 226 may be configured to time from the first falling edge for the comparator output signal following the SR switch off time to the subsequent rising edge for the comparator output signal to measure the half-period. Alternatively, the timing may be from a rising edge to a falling edge for the comparator output signal. Similarly, a complete resonant oscillation period may be measured by timing from a rising edge to a subsequent rising edge (or from a falling edge to a subsequent falling edge). If the measurement is from one edge type to the other, control logic circuit 226 may then merely double the measured half-period to obtain the resonant period and set the minimum off-time for timer 224 to be at least as long as the resonant period. Both timer 224 and control logic circuit 226 may include a counter (which may be the same counter) that counts responsive to a system clock or oscillator output (not illustrated) to time their respective periods.

The measurement of the resonant period may be periodically repeated so as to adapt to any changes in the resonant oscillation period. In response to such changes in the period of the resonant oscillation (e.g., ringing of the drain-to-source ($V_{D-S}$) waveform), control logic circuit 226 may adaptively adjust the minimum off-time period to either increase or decrease the minimum off-time period as needed. An increase of the minimum off-time period may be limited to not exceed a maximum allowable off-time period so that the SR controller may be ready to switch on the SR switch transistor in response to the power switch transistor being cycled off in the subsequent power switch cycle. In further embodiments, voltage sensor 222, timer 224, and control logic circuit 226 may be implemented using a combination of hardware, software, and/or firmware components.

When the power switch transistor is placed in the on state, an input voltage V_IN drives a primary current into the primary windings Np of transformer T. Based upon the input voltage V_IN and a magnetizing inductance for transformer T1, the primary current ramps up from zero Amperes (Amps) to a peak current value, whereupon the primary controller turns off the power switch transistor to complete a power cycle.

The SR controller is configured to switch on the SR switch transistor after the power switch transistor is cycled off to deliver the magnetic energy stored in transformer T1 to the load through the output voltage and current. The secondary current through the secondary winding Ns pulses high and then begins to ramp towards zero. For example, the SR controller may turn on the SR switch transistor responsive to the SR switch voltage falling below the on-time threshold voltage (e.g., approximately −400 mV). As is conventional, the SR controller will then switch off the SR switch transistor when the energy stored in transformer T1 is exhausted at the transformer reset time. The transformer reset point (T1 reset) occurs when the secondary current reaches zero Amps, at which point the SR controller turns off the SR switch transistor. For example, the SR controller may turn off the SR switch responsive to the SR switch voltage exceeding the off-time threshold voltage (e.g., 0 V).

Following the transformer reset time and prior to a subsequent cycling of the power switch transistor S1, the SR controller should maintain the SR switch transistor off. But as discussed previously, the resonant oscillation of the SR switch voltage following the SR switch transistor off time and continuing past the minimum off-time period may cause the SR switch voltage to cross the on-time threshold voltage such that the SR switch transistor is then turned on. Since this erroneous cycling on of the SR switch transistor is conducted prior to the cycling on of the power switch transistor, the off-time threshold voltage will be promptly violated after expiration of the minimum on-timer period. But the adaption of the minimum off-time period responsive to the measurement of the resonant oscillation period prevents this undesirable cycling of the SR switch transistor. This advantageous prevention of the erroneous SR switch cycling may be better understood with consideration of the waveforms shown in FIG. 3.

Note that the source voltage for the SR switch transistor corresponds to ground for the SR controller. It is thus deemed equivalent herein to refer to the SR switch voltage as either the drain voltage or as the drain-to-source voltage ($V_{DS}$). Prior to the cycling on of the power switch transistor, the drain voltage for the SR switch transistor equals the output voltage (designated as the Vout Voltage level in FIG. 3). The drain voltage will thus pulse high while the power switch transistor is on. Following the cycling off of the power switch transistor at a time T0, the drain voltage falls below the on-time threshold voltage (S2 ON threshold). This threshold crossing at time T0 for the drain voltage causes the SR controller to switch on the SR switch transistor (the S2 control signal being pulsed high). Once all the energy has been delivered to the secondary output stage 220 and the secondary current reaches zero amps, the $V_{DS}$ waveform exceeds the off-time threshold voltage (S2 OFF threshold) such that the SR switch transistor is cycled off (the S2 control signal being discharged to ground) at a time T1.

Figure 1:
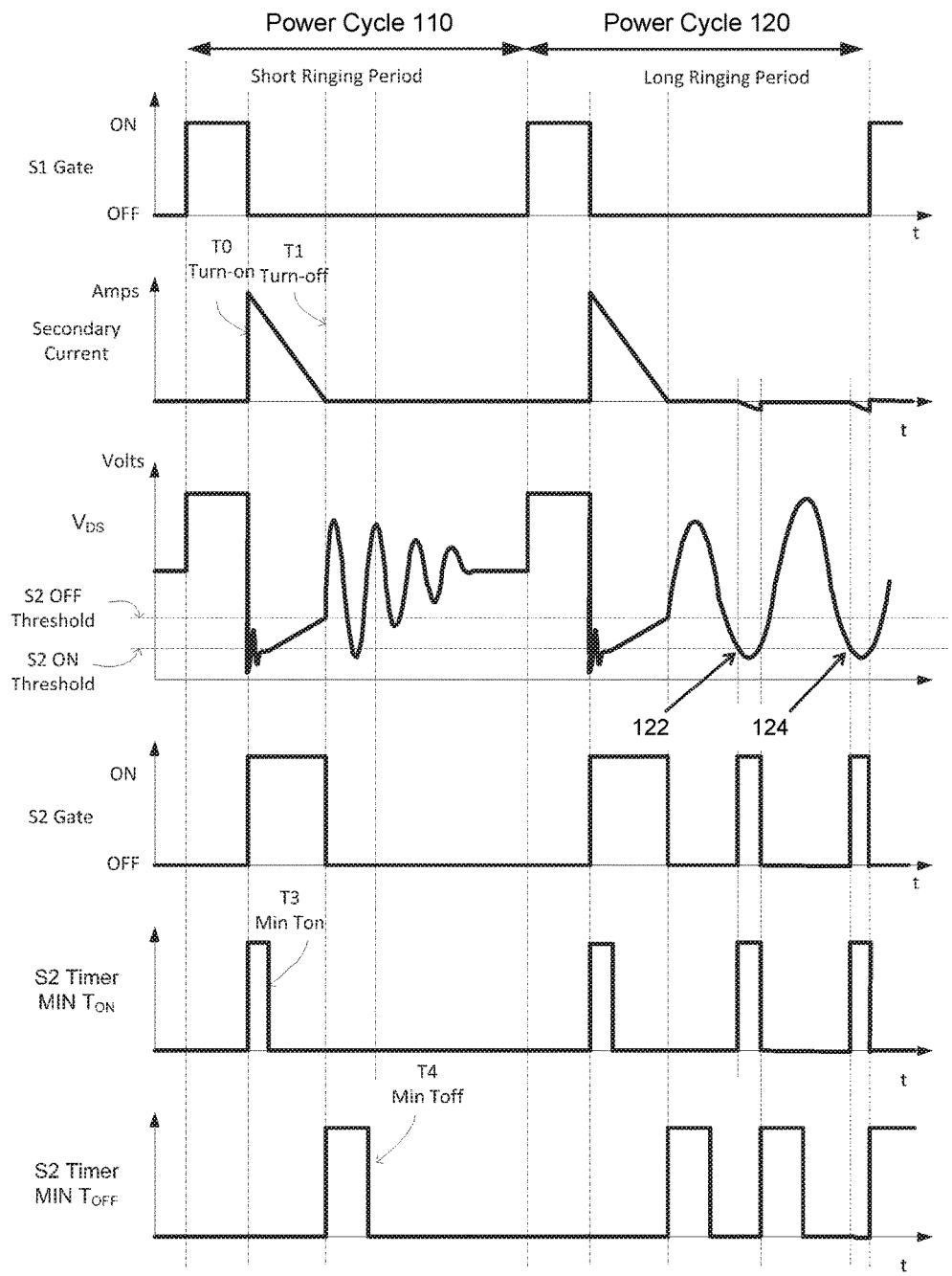
FIG. 1 illustrates waveforms for a flyback converter with conventional synchronous rectifier control.

Setting the minimum off-time duration to a pre-set value is difficult as the ringing period on the $V_{DS}$ waveform when the SR switch transistor is initially turned off varies depending on parasitic effects and the transformer T1 parameters. It is desirable for the SR controller to set the minimum off-time duration long enough such that the first negative swing (first falling edge) of the ringing on the $V_{DS}$ waveform occurs during the minimum off-time period. In this fashion, even if the negative swing of the $V_{DS}$ waveform goes below the on-time threshold voltage, the SR controller will not respond to this resonant oscillation. An example of such a crossing is shown in power cycle 110 in FIG. 1, where the first negative swing does cross the S2 ON threshold, but it occurs within the bounds of the minimum off-time duration (T4 Min Toff shown in FIG. 1). But in power cycle 120 as discussed with regard to FIG. 1, the ringing period is longer than the minimum off-time duration where the first swing crosses the S2 ON threshold at time 122, and the SR controller may be mis-triggered to turn on the SR switch transistor by this ringing. Conversely, if the minimum off-time duration is set too long, it may block the appropriate turn-on of the SR switch transistor for the subsequent power switch cycle.

Figure 3:
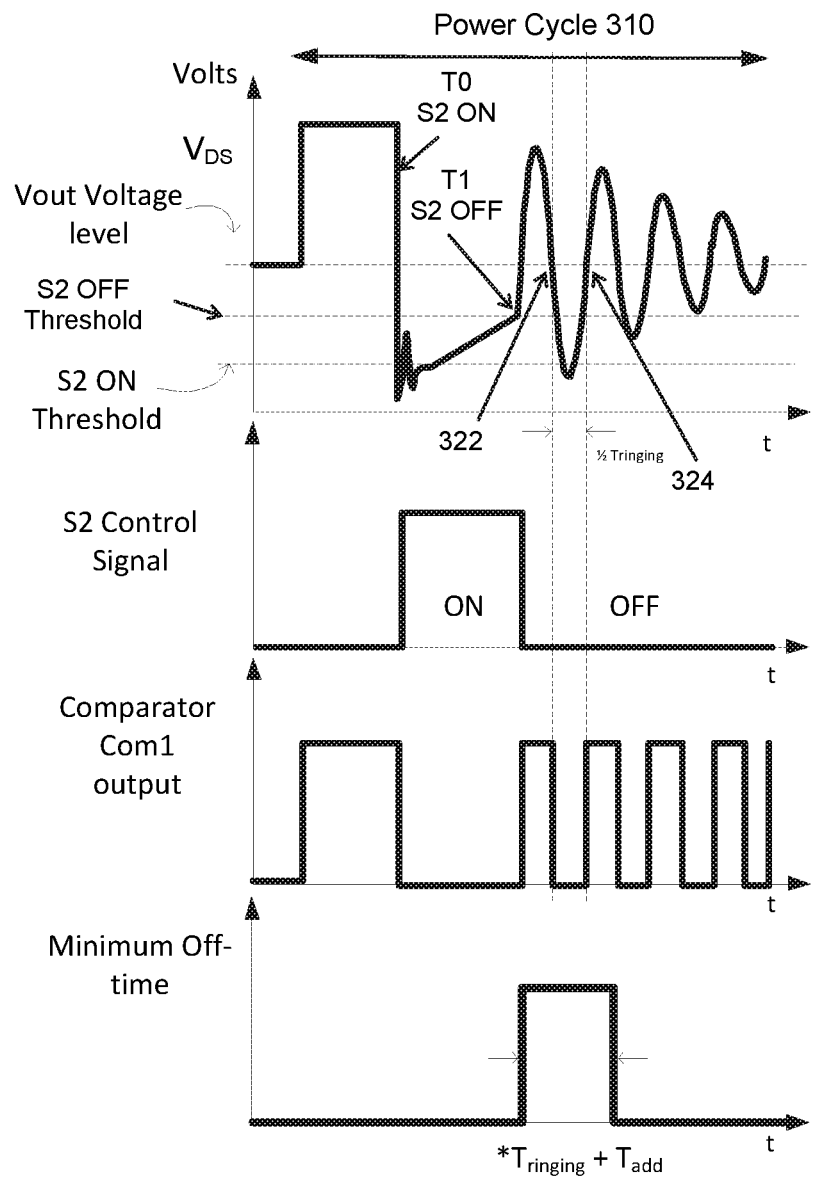
FIG. 3 illustrates waveforms for a flyback converter with adaptive synchronous rectifier control in accordance with an aspect of the disclosure.

This problem is solved by detecting the resonant oscillation period and setting or adjusting the minimum off-time duration accordingly. In order to detect the ringing period, the comparator compares the voltage across the SR switch transistor ($V_{DS}$ waveform) and the system output voltage (Vout) and drives its output signal (COM1) accordingly. When the voltage across the SR switch transistor is the same as the system output voltage, e.g., when the $V_{DS}$ waveform falls below the Vout voltage level, such as at time 322, the comparator output signal COM1 may be switched to logic zero (the first falling edge for the comparator output signal COM1 following the SR switch transistor off time at time T1). But as the $V_{DS}$ waveform then exceeds the Vout voltage level such as at time 324, the comparator output signal COM1 may be switched to logic one (the subsequent rising edge for the comparator output signal COM1 following its first falling edge). In one embodiment, after the SR switch transistor is turned off (at time T1 S2 OFF in FIG. 3), the time between the comparator output signal COM1 first falling edge at time 322 and its following rising edge at time 324 is measured. That time is half of the ringing period $T_{ringing}$. This measurement result can be doubled to get the resonant oscillation period $T_{ringing}$. Adding an additional delay $T_{add}$, such as an amount of time that is less than or equal to 10% of $T_{ringing}$, on top of the ringing period can be used to set the minimum off-time duration MIN $T_{off} = T_{ringing} + T_{add}$, as shown in FIG. 3, for the subsequent power cycle. Due to the minimum off-time duration having been set adaptively according to the period of the ringing for the previous power cycle and the minimum off-time being enabled by the control logic circuit 226 and minimum off-timer 224, the first negative swing of $V_{DS}$ after the SR switch transistor is turned off does not trigger the S2 ON threshold, but instead occurs within the bounds of the adaptively set minimum off-time duration, so the $V_{ips}$ waveform does not trigger the on-time threshold voltage (S2 ON threshold) until the next power cycle begins after power cycle 310, thus representing proper synchronous rectifier control.

Figure 4:
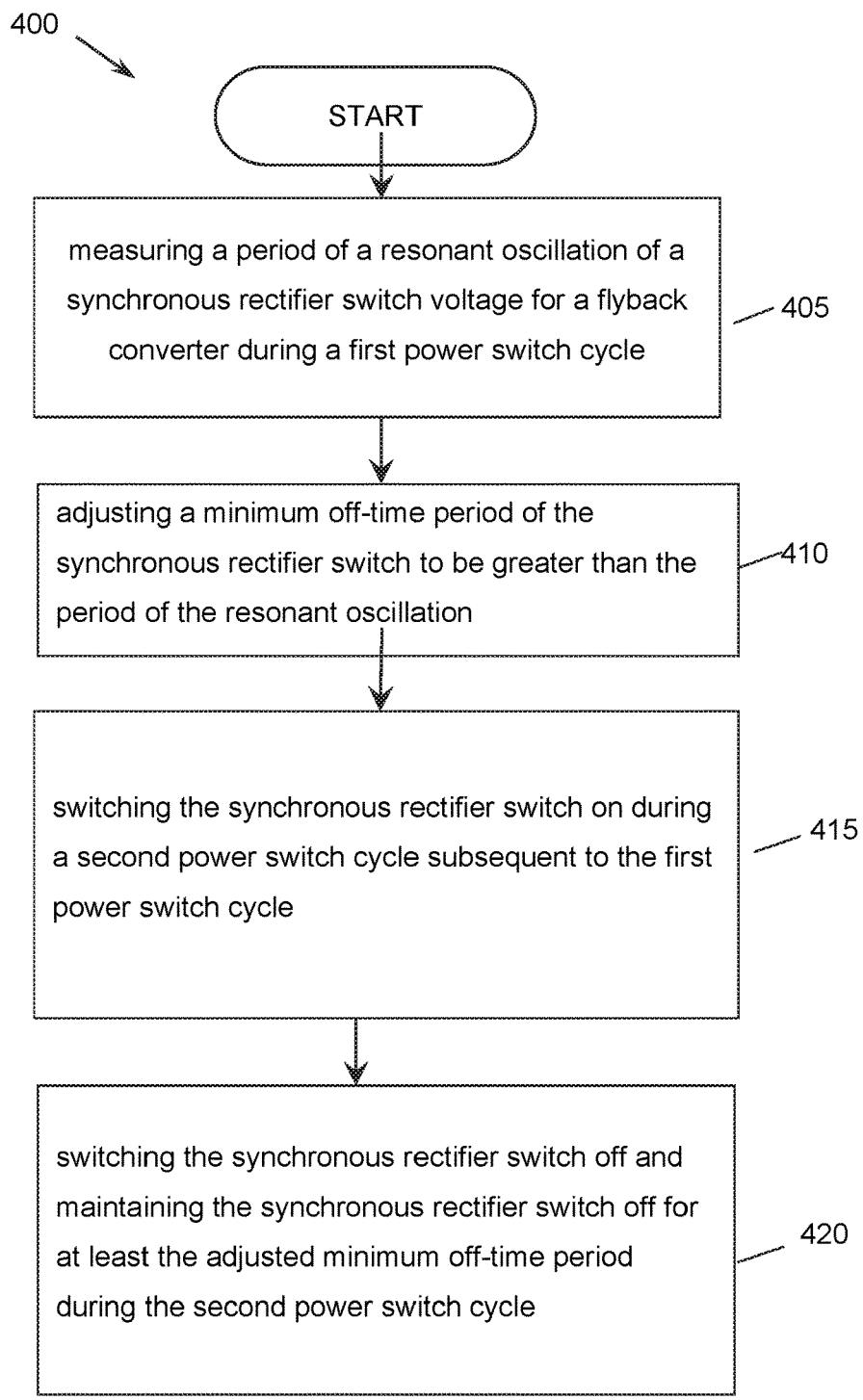
FIG. 4 is a flowchart for an example method of operation in accordance with an aspect of the disclosure.

A method 400 of operation will now be discussed with reference to a flowchart shown in FIG. 4. Method 400 begins with an act 405 of measuring a period of a resonant oscillation of a synchronous rectifier switch voltage for a synchronous rectifier switch transistor in a flyback converter during a first power switch transistor cycle. The measurement of the resonant period (Tringing) as discussed with regard to FIG. 3 is an example of act 405. In addition, method 400 includes an act 410 of adjusting a minimum off-time period of the synchronous rectifier switch transistor to provide an adjusted minimum off-time period that is greater than the period of the resonant oscillation. The adjustment of the minimum off-time period to be greater than Tringing as discussed with regard to FIG. 3 is an example of act 410.

Method 400 also includes an act 415 of switching the synchronous rectifier switch transistor on during a second power switch transistor cycle subsequent to the first power switch transistor cycle. The switching on of the SR switch transistor at time T0 as discussed with regard to FIG. 3 is an example of act 415. Finally, method 400 includes an act 420 of switching the synchronous rectifier switch transistor off and maintaining the synchronous rectifier switch transistor off for at least the adjusted minimum off-time period during the second power switch transistor cycle. The switching off of the SR switch transistor at time T1 and keeping the SR switch transistor off for at least the adjusted minimum off-time period as discussed with regard to FIG. 3 is an example of act 420.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A flyback converter, comprising:
   a synchronous rectifier switch coupled to a secondary winding of a transformer; and
   a synchronous rectifier controller configured to control a cycling of the synchronous rectifier switch and including a controller logic circuit configured to measure a resonant oscillation period for a terminal voltage for the synchronous rectifier switch in a first cycle of the synchronous rectifier switch, the controller logic circuit being further configured to time an adjusted minimum off-time period for the synchronous rectifier switch having a duration at least as long as the resonant oscillation period, and wherein the synchronous rectifier controller is further configured to maintain the synchronous rectifier switch off in a subsequent cycle of the synchronous rectifier switch for at least the adjusted minimum off-time period.

2. The flyback converter of claim 1, wherein the synchronous rectifier controller is configured to both switch the synchronous rectifier switch off and to begin timing the adjusted minimum off-time period in the subsequent cycle of the synchronous rectifier switch responsive to the terminal voltage exceeding an off-time threshold voltage.

3. The flyback converter of claim 2, wherein the synchronous rectifier controller further includes a minimum off-time timer configured to time the adjusted minimum off-time period.

4. The flyback converter of claim 2, wherein the synchronous rectifier controller is further configured to switch on the synchronous rectifier switch on in another cycle of the synchronous rectifier switch responsive to the terminal voltage being less than an on-time threshold voltage following an expiration of the adjusted minimum off-time period.

5. The flyback converter of claim 4, wherein the on-time threshold voltage is less than the off-time threshold voltage.

6. The flyback converter of claim 1, wherein the synchronous rectifier controller further includes a comparator configured to compare the terminal voltage for the synchronous rectifier switch to an output voltage for the flyback converter to provide a comparator output signal, and wherein the controller logic circuit is further configured to measure the resonant oscillation period for the terminal voltage responsive to a delay between a first edge for the comparator output signal and a subsequent second edge for the comparator output signal.

7. The flyback converter of claim 1, wherein the synchronous rectifier controller is further configured to set the adjusted minimum off-time period for the synchronous rectifier switch to equal a sum of the resonant oscillation period plus a fractional amount of the resonant oscillation period.

8. The flyback converter of claim 7, wherein the fractional amount of the resonant oscillation period is no more than 10% of the resonant oscillation period.

9. The flyback converter of claim 1, further comprising:
a power switch coupled to a primary winding of the transformer; and
a primary controller configured to cycle the power switch to regulate an output voltage across a load coupled to the secondary winding.

10. The flyback converter of claim 1, wherein the synchronous rectifier switch is a field-effect transistor (FET).

11. A method comprising:
measuring a period of a resonant oscillation of a synchronous rectifier switch voltage for a synchronous rectifier switch in a flyback converter during a first power switch cycle to provide a measured period of the resonant oscillation;
adjusting a minimum off-time period of the synchronous rectifier switch to provide an adjusted minimum off-time period that has a duration at least as long as the measured period of the resonant oscillation;
switching the synchronous rectifier switch on during a second power switch cycle subsequent to the first power switch cycle; and
switching the synchronous rectifier switch off and maintaining the synchronous rectifier switch off for at least the adjusted minimum off-time period during the second power switch cycle.

12. The method of claim 11, wherein the measuring of the period of the resonant oscillation comprises comparing the synchronous rectifier switch voltage in a comparator to form a comparator output signal.

13. The method of claim 12, wherein the measuring of the period of the resonant oscillation comprises determining a time duration from a first binary transition for the comparator output signal to a second binary transition for the comparator output signal.

14. The method of claim 13, wherein the first binary transition is a falling edge transition and the second binary transition is a rising edge transition.

15. The method of claim 11, wherein the adjusted minimum off-time period equals the measured period of the resonant oscillation plus a fraction of the measured period of the resonant oscillation.

16. The method of claim 15, wherein the fraction of the measured period of the resonant oscillation equals 10% of the measured period of the resonant oscillation.

17. A synchronous rectifier controller, comprising:
a controller logic circuit configured to measure a resonant oscillation period of a drain voltage for a synchronous rectifier switch during a first cycle of the synchronous rectifier switch and to set a minimum off-time for the synchronous rectifier switch that has a duration at least as long as the resonant oscillation period for a second cycle of the synchronous rectifier switch; and
a timer configured to time the minimum off-time, wherein the controller logic circuit is further configured to maintain the synchronous rectifier switch off in the second cycle of the synchronous rectifier switch for at least the duration of the minimum-off time as timed by the timer.

18. The synchronous rectifier controller of claim 17, wherein the controller logic circuit further includes a comparator configured to compare the drain voltage to form a comparator output signal, and wherein the controller logic circuit is further configured to measure the resonant oscillation period through a measurement of a delay from a first edge in the comparator output signal to a second edge in the comparator output signal.

19. The synchronous rectifier controller of claim 18, wherein the comparator is further configured to compare the drain voltage to an output voltage to form the comparator output signal.

20. The synchronous rectifier controller of claim 18, wherein the comparator is further configured to compare the drain voltage to a threshold voltage to form the comparator output signal.

* * * * *